United States Patent
Lu et al.

(10) Patent No.: US 7,856,614 B2
(45) Date of Patent: Dec. 21, 2010

(54) PROGRAMMABLE SYSTEM-ON-CHIP APPARATUS AND METHOD FOR UPDATING FIRMWARE

(75) Inventors: Chi-Chang Lu, Hsinchu (TW); Pei-Ting Tsai, Tai Tung (TW); Chien-Chou Chen, Chang Hua (TW)

(73) Assignee: Etron Technology, Inc., Hsin Chu (TW)

( * ) Notice: Subject to any disclaimer, the term of this patent is extended or adjusted under 35 U.S.C. 154(b) by 782 days.

(21) Appl. No.: 11/806,628

(22) Filed: Jun. 1, 2007

(65) Prior Publication Data

US 2008/0034151 A1 Feb. 7, 2008

(30) Foreign Application Priority Data

Aug. 3, 2006 (TW) ............................. 95128424 A

(51) Int. Cl.
*G06F 17/50* (2006.01)
*H03K 17/693* (2006.01)
*G06F 9/00* (2006.01)

(52) U.S. Cl. ........................................ 716/117; 713/1

(58) Field of Classification Search .................. 716/6, 716/117; 713/1
See application file for complete search history.

(56) References Cited

U.S. PATENT DOCUMENTS

| 2004/0030953 A1* | 2/2004 | Sun et al. ............... 714/10 |
| 2004/0068644 A1* | 4/2004 | Hutton et al. ............. 713/1 |
| 2005/0097499 A1* | 5/2005 | Sun et al. ................ 716/16 |
| 2005/0160217 A1* | 7/2005 | Gonzalez et al. ......... 711/6 |

\* cited by examiner

*Primary Examiner*—Jack Chiang
*Assistant Examiner*—Suresh Memula
(74) *Attorney, Agent, or Firm*—Muncy, Geissler, Olds & Lowe, PLLC

(57) ABSTRACT

A programmable system-on-chip (SOC) apparatus is disclosed. After connecting with a computer host, the apparatus temporarily stored boot loader codes into a volatile memory originally installed in the apparatus. Further, during the whole updating firmware procedure, no burner is required. Accordingly, the invention not only saves the hardware cost of both a non-volatile memory and the burner, but also simplifies the operation procedure.

7 Claims, 7 Drawing Sheets

PROGRAMMABLE SYSTEM-ON-CHIP APPARATUS AND METHOD FOR UPDATING FIRMWARE

BACKGROUND OF THE INVENTION

1. Field of the Invention

The invention relates to a System-on-Chip (SOC), and, more particularly, to a programmable SOC apparatus and a method for updating firmware in programmable SOC apparatus.

2. Description of the Related Art

FIG. 1A is a data flow diagram showing that boot loader codes are being programmed into a SOC via a burner 170 according to prior art. FIG. 1B is a data flow diagram showing that a microcontroller programs firmware executed in a normal mode into the SOC after executing the boot loader codes and connecting with a computer host according to prior art.

Throughout the specification and claims, the following terms take the meanings explicitly associated herein, unless the context clearly dictates otherwise. The term "in system programming (ISP) mode" refers to a mode in which the SOC executes the boot loader codes to program firmware into a non-volatile memory. In contrast, the term "normal mode" refers to a mode in which the SOC executes firmware to implement specialized functions or service. For example, if it is a cellular phone system, the firmware that the SOC executes needs to realize wireless communication.

Conventionally, updating firmware comprises two steps as follows. Step 1: As showing in FIG. 1A, at first, place a SOC 100 into a burner 170. Next, boot loader codes are programmed into the flash memory 130B via the burner 170 and a logic circuit 120. Wherein, the burner 170 can be also controlled by another controller (such as a computer host). Step 2: As showing in FIG. 1B, while attempting to update firmware, the SOC 100 enters an ISP mode first. At this moment, the microcontroller 110 starts to execute the boot loader codes and the SOC 100 connects with the computer host 160 via the microcontroller 110 and a transmission interface 140. Then, the SOC 100 moves or loads firmware that is executed in a normal mode from the computer host 160 into a flash memory 130A via the microcontroller 110. Afterwards, while the SOC 100 enters the normal mode, the microcontroller 110 starts to execute firmware stored in the flash memory 130A.

As previously discussed, conventionally, it is necessary for an updating firmware procedure to use a burner 170 which programs the flash memory 130B with the boot loader codes. In addition, the SOC 100 needs two flash memories: the flash memory 130A for storing the boot loader codes and the flash memory 130B for storing firmware that the SOC 100 executes in the normal mode. However, the flash memory 130B is not used in the normal mode, but in the ISP mode, causing a waste of resource. Thus, the conventional method for updating firmware, as a whole, yields a relatively high hardware cost and has an inconvenient programming procedure.

SUMMARY OF THE INVENTION

In view of the above-mentioned problems, an object of the invention is to provide a programmable SOC apparatus.

Another object of the invention is to provide a method for updating firmware.

To achieve the above-mentioned object, a programmable SOC apparatus of the invention is connected to a computer host for updating firmware that the programmable SOC apparatus executes in a normal mode. The programmable SOC apparatus comprises: a microcontroller, a transmission and logic module, a non-volatile memory, a volatile memory, a transmission interface and a multiplexer.

The transmission interface is connected to the computer host while the multiplexer receives both the address data of a first address bus and the address data of a second address bus, and selects either of the two address data for output as the address data of a third address bus. The volatile memory is connected to the third address bus and adapted to store boot loader codes. The transmission and logic module receives the boot loader codes from the computer host via the transmission interface and stores the boot loader codes into the volatile memory via the first address bus and a data bus. Wherein, the multiplexer selects the address data of the first address bus for output as the address data of the third address bus and the transmission and logic module enables a control signal while receiving a predetermined instruction from the computer host. And, the microcontroller connected to the second address bus receives the control signal. If the control signal is enabled, the multiplexer selects the address data of the second address bus for output as the address data of the third address bus. After reading and executing the boot loader codes, the microcontroller connects with the computer host via the transmission interface to program firmware. The non-volatile memory is connected to the microcontroller and adapted to store firmware.

In a first embodiment, all devices of the programmable SOC apparatus are integrated in one chip. In a second embodiment, the non-volatile memory is an external device to the SOC.

A method for updating firmware according to the invention comprises: connecting a programmable SOC apparatus with a computer host; storing boot loader codes into a volatile memory of the programmable SOC apparatus by means of the computer host; enabling a control signal while the computer host provides a predetermined instruction; and, storing firmware that the programmable SOC apparatus executes in a normal mode into a non-volatile memory of the programmable SOC apparatus according to the boot loader codes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The programmable SOC apparatus and a method for updating firmware of the invention will be described with reference to the accompanying drawings.

Figure 1A:
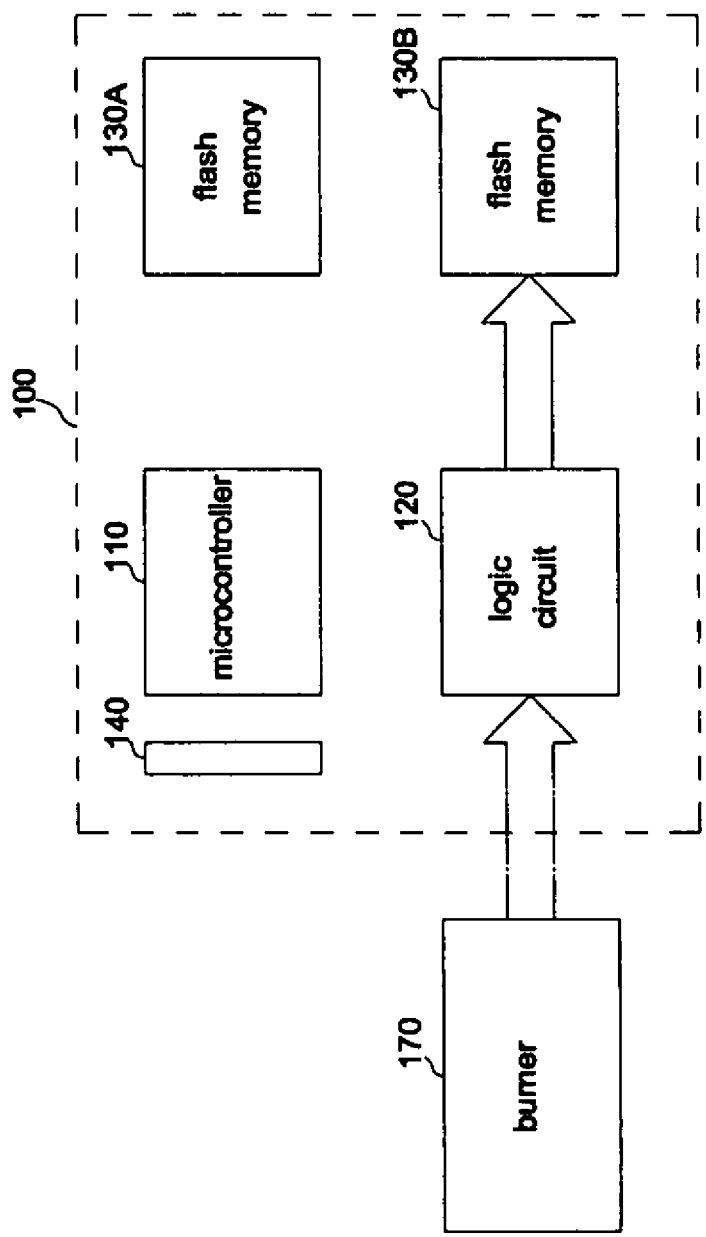
FIG. 1A is a data flow diagram showing that that boot loader codes are being programmed into a SOC via a burner according to prior art.
Figure 1B:
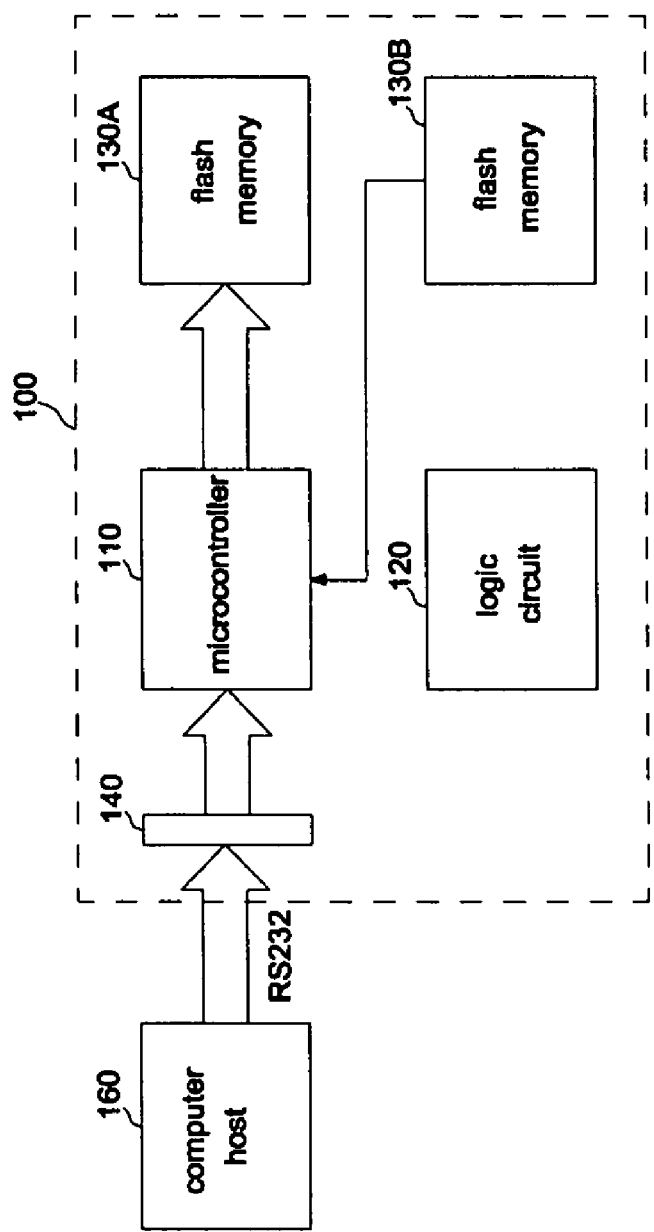
FIG. 1B is a data flow diagram showing that a microcontroller programs firmware into the SOC after executing the boot loader codes and connecting with a computer host according to prior art.
Figure 2:
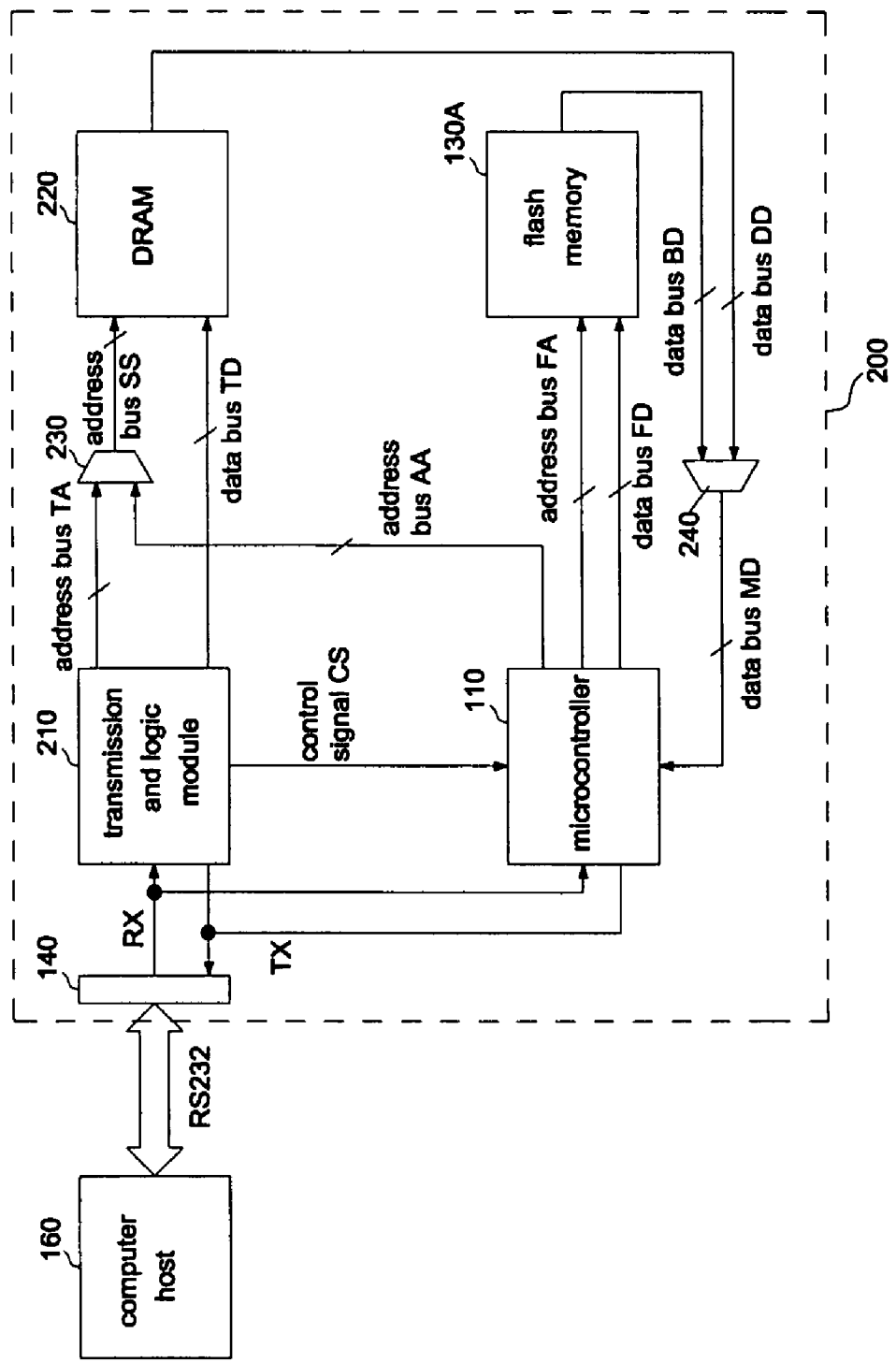
FIG. 2 is a block diagram illustrating a programmable SOC apparatus according to a first embodiment of the invention.

FIG. 2 is a block diagram illustrating a programmable SOC apparatus according to a first embodiment of the invention. A programmable SOC apparatus 200 of the invention comprises a microcontroller 110, a flash memory 130A, a transmission and logic module 210, a dynamic random access memory (DRAM) 220, a transmission interface 140 and two multiplexers 230, 240. Wherein, all devices of the programmable SOC apparatus 200 are embedded in one chip.

One terminal of the transmission and logic module 210 is connected to the transmission interface 140 via a RS232 transmission line and another terminal is connected to both the multiplexer 230 via a address bus TA and the DRAM 220 via a data bus TD while a third terminal is connected to the microcontroller 110 via a control signal CS. The multiplexer 230 selects either data of the address bus TA or data of the address bus AA for output as the data of an address bus SS. The DRAM 220 is connected to both the multiplexer 230 via the address bus SS and the multiplexer 240 via the data bus DD. One terminal of the microcontroller 110 is connected to the transmission interface 140 and another terminal is connected to the flash memory 130A via a address bus FA and a data bus FD while a third terminal is connected to the multiplexer 230 via the address bus AA. The multiplexer 240 selects either of the data on the two data buses BD, AA for output as the data of a data bus MD.

Hereinafter, the operation of the programmable SOC apparatus 200 is detailed. Also, for an intelligible explanation, the whole updating firmware procedure is divided into two stages. The first is a downloading stage and the second is a programming stage.

Figure 3A:
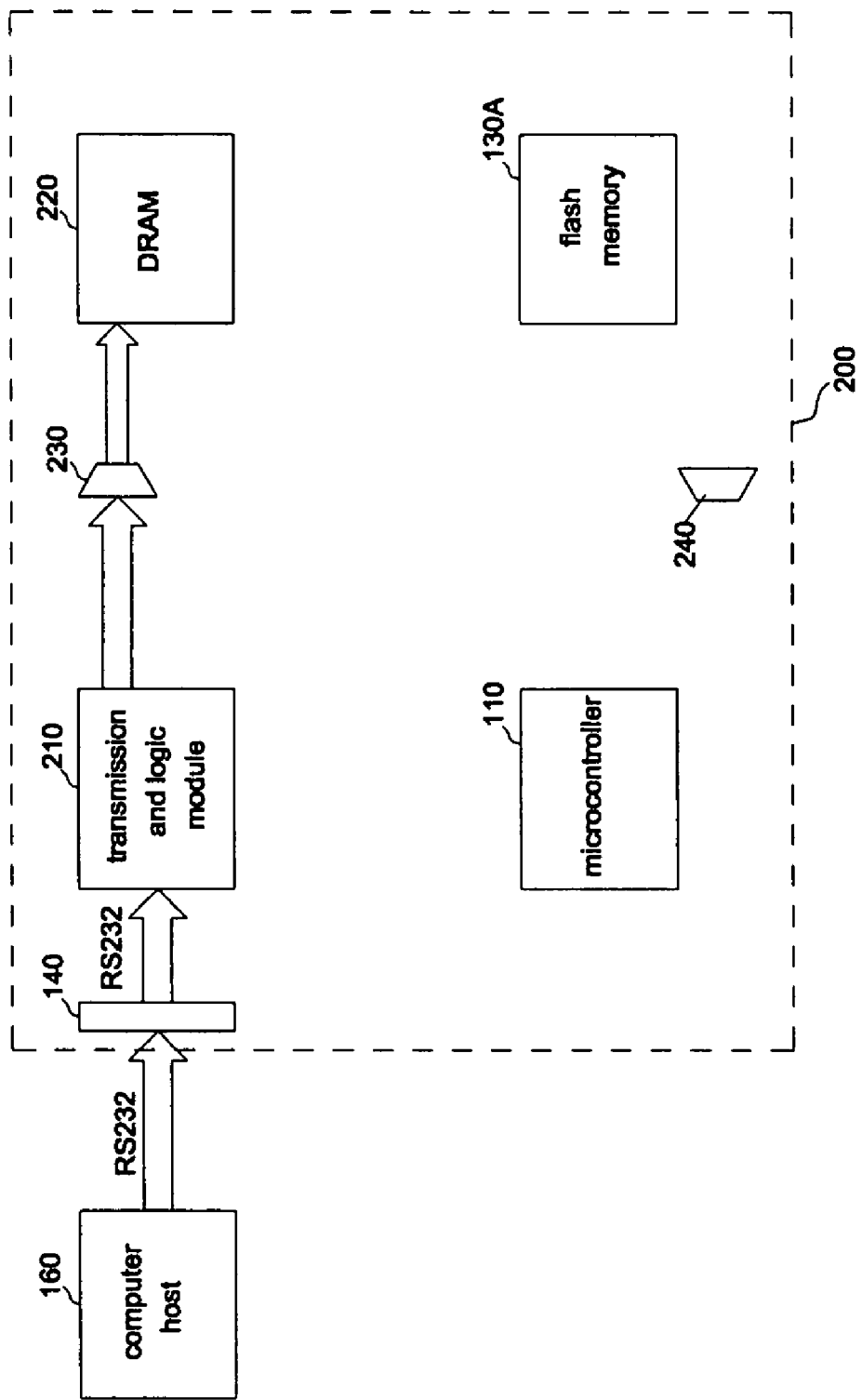
FIG. 3A shows a data-flow diagram during the downloading stage according to the first embodiment of the invention.
Figure 3B:
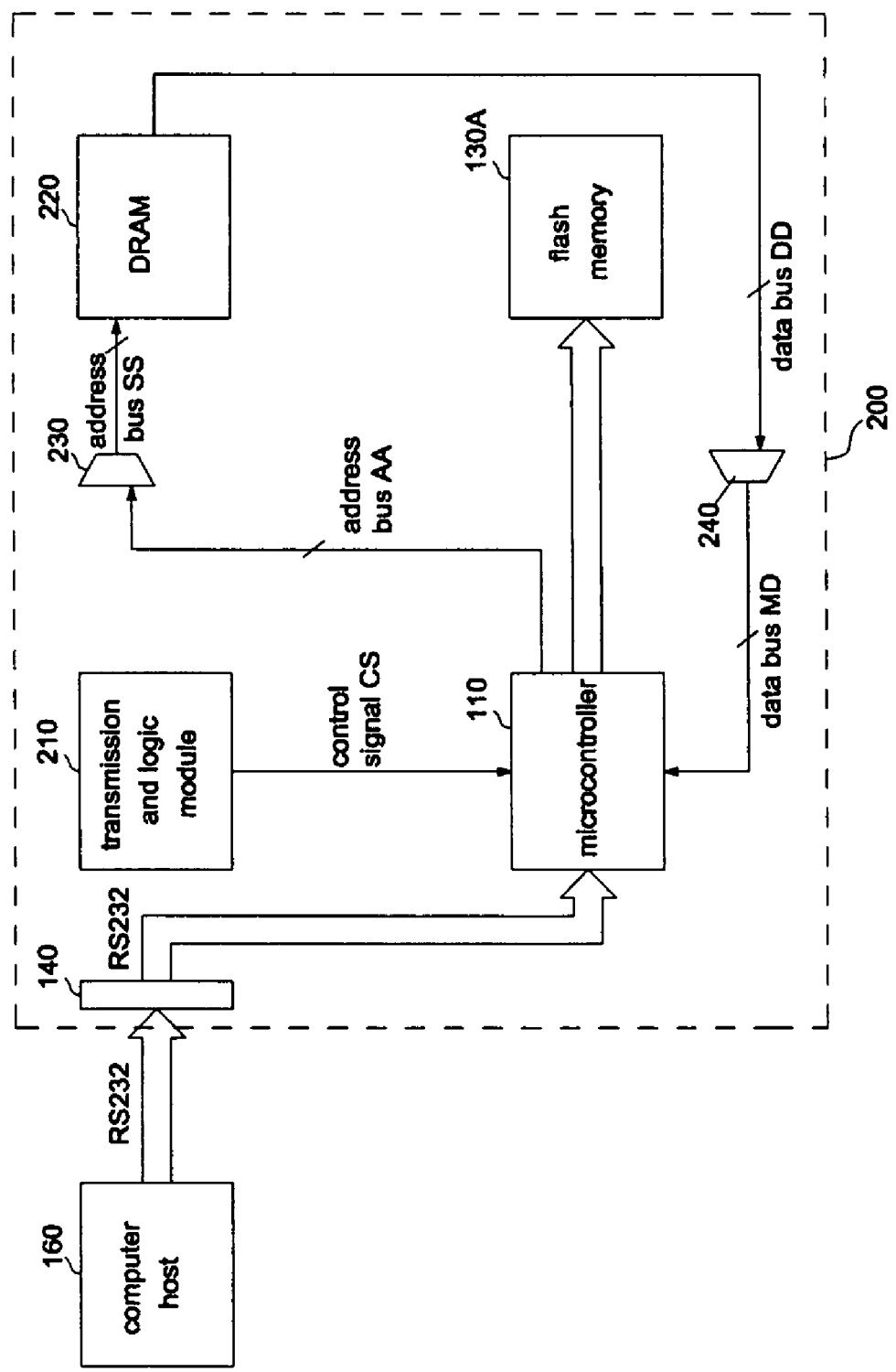
FIG. 3B shows a data-flow diagram during the programming stage according to the first embodiment of the invention.

FIG. 3A shows a data-flow diagram during the downloading stage according to the first embodiment of the invention. FIG. 3B shows a data-flow diagram during the programming stage according to the first embodiment of the invention.

During the downloading stage, referring to FIGS. 2 and 3A, the transmission and logic module 210 is connected to the computer host 160 via the transmission interface 140 so as to receive the boot loader codes. At this moment, the multiplexer 230 selects the data of the address bus TA for output as the data on the address bus SS. Afterwards, the transmission and logic module 210 receives and stores the boot loader codes into the DRAM 220 via the multiplexer 230 by utilizing the address bus TA and the data bus TD. As downloading of the boot loader codes is complete, the computer host 160 will issue a termination instruction (such as 0x55AA) to inform the transmission and logic module 210 that the downloading stage is finished. After receiving the termination instruction, the transmission and logic module 210 enables the control signal CS.

After receiving the enabled control signal CS, the microcontroller 110 enters the second stage of the updating firmware procedure: the programming stage. Referring now to FIGS. 2 and 3B, the enabled control signal CS activates the microcontroller 110 and then the microcontroller 110 is set into an ISP mode. At the same time, the multiplexer 240 selects the data of the data bus DD for output as the data of the data bus MD. Thus, the microcontroller 110 starts to execute the boot loader codes that reside in the DRAM 220; meanwhile, the microcontroller 110 also communicates with the computer host 160 via the transmission interface 140. Next, while receiving firmware that the programmable SOC apparatus executes in a normal mode from the computer host 160, the microcontroller 110 programs firmware into the flash memory 130A via the address bus FA and the data bus FD until the programming is complete. Accordingly, the whole updating firmware procedure is accomplished. Finally, after the system is rebooted, the boot loader codes previously stored in the DRAM 220 is gone and therefore the space of the DRAM 220 is released. The microcontroller 110 is reactivated to enter the normal mode. At this point, the multiplexer 240 selects the data of the data bus BD for output as the data of the data bus MD, so the microcontroller 110 starts to execute firmware that resides in the flash memory 130A.

Regarding the conventional updating firmware procedure, a burner is required and, moreover, the SOC 100 needs to be pulled and inserted, making the procedure very inconvenient. In contrast, during the whole updating firmware procedure according to the invention, no burner is required but only to connect the programmable SOC apparatus 200 with the computer host 160. It is quite convenient that both the downloading stage and the programming stage can be completed at one time. In addition, during the downloading stage, other than employing an additional flash memory 130B merely for storing the boot loader codes, the invention uses the DRAM 220 which is nearly indispensable to all SOCs, therefore saving board space and hardware cost.

Figure 4:
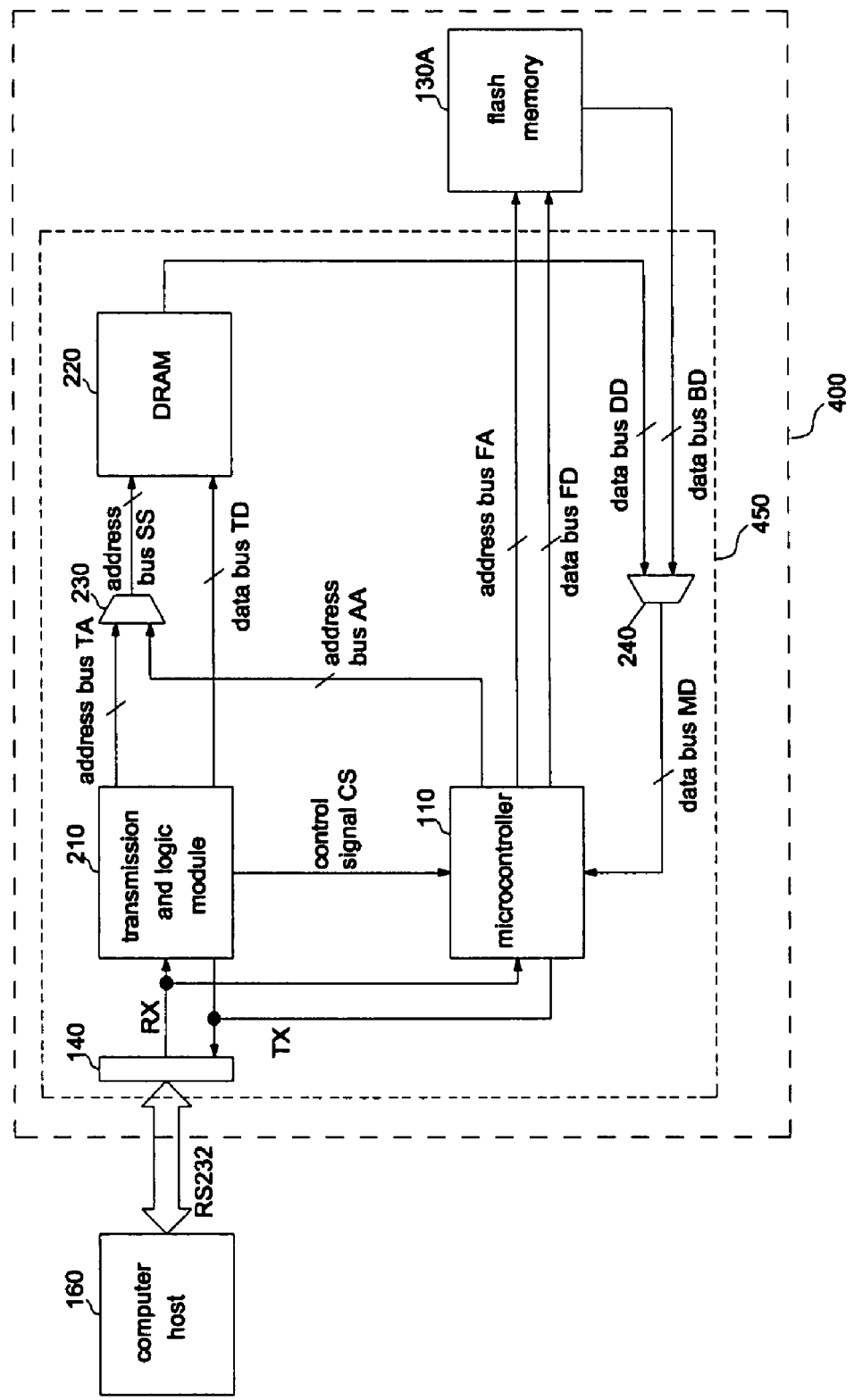
FIG. 4 is a block diagram illustrating a programmable SOC apparatus according to a second embodiment of the invention.

FIG. 4 is a block diagram illustrating a programmable SOC apparatus according to a second embodiment of the invention. Comparing the first embodiment with the second embodiment, the difference is that the flash memory 130A is external to the programmable SOC apparatus 400. That is, the microcontroller 110, the transmission and logic module 210, the DRAM 220, the transmission interface 140 and the multiplexers 230, 240 are embedded in one chip 450 while the flash memory 130A is located outside the chip 450. However, both (the chip 450 and the flash memory 130A) are still installed within one printed circuit board and connect each other using the address bus FA, the data bus FD and the data bus BD. According to the prior art, the flash memory is generally embedded in the SOC and the burner is configured to program flash memories for specific types or part numbers. In contrast, an advantage of the invention is that the type or the part number of the external flash memory 130A is allowed to be changed freely. If a different part number of the flash memory is intended to be programmed, only software needs to be modified, making the updating firmware procedure very flexible.

Wherein, in addition to a serial interface, the transmission interface 140 can be a parallel interface, a universal serial interface or an inter-IC serial interface. The DRAM 220 can be replaced by any type of volatile memory, such as a static random access memory or a double data rate dynamic random access memory. Also, the flash memory 130A can be replaced by any type of non-volatile memory, such as an electrically erasable programmable read-only memory. Those skilled in the art will recognize that other suitable types of non-volatile programmable read only memories may be utilized to the same effect.

Figure 5:
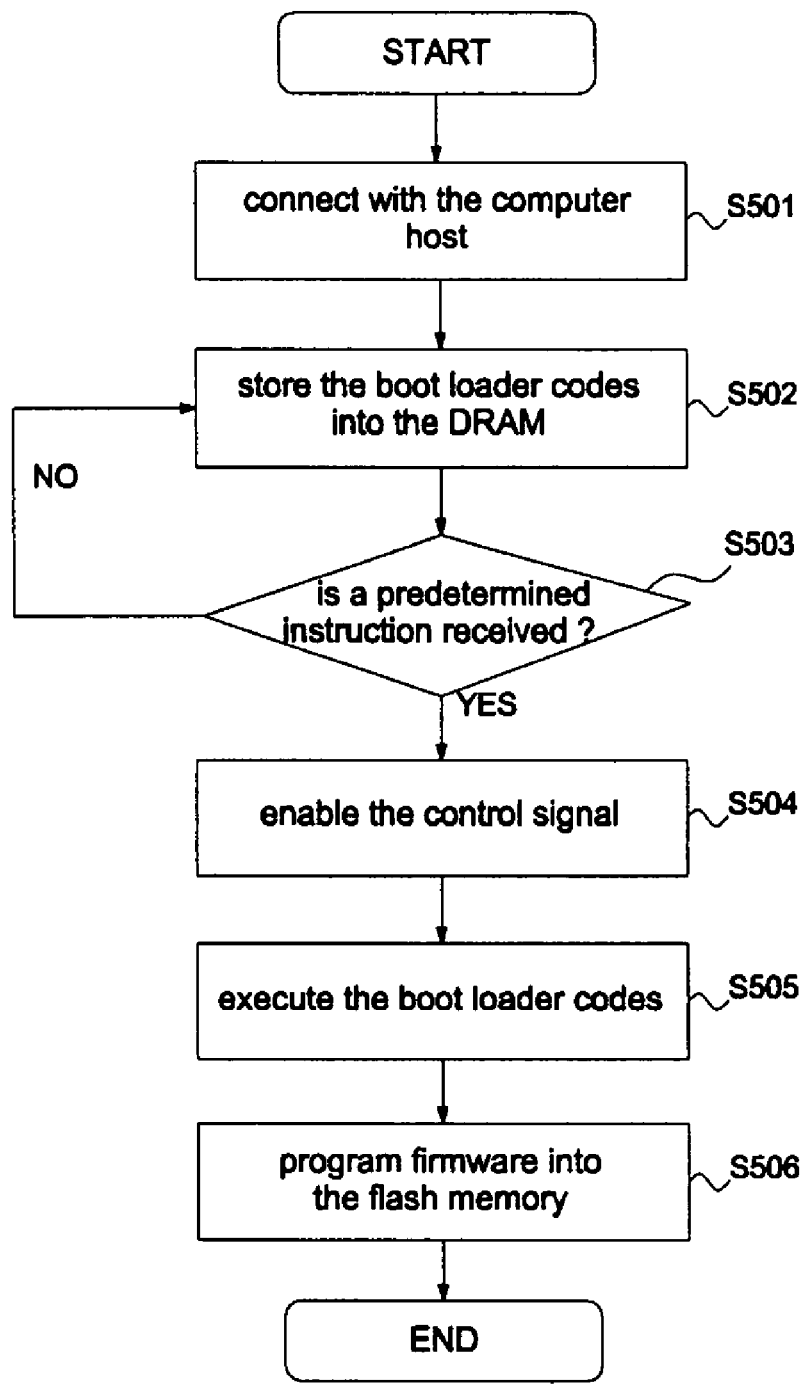
FIG. 5 is a flow chart illustrating a method for updating firmware according to the invention.

FIG. 5 is a flow chart illustrating a method for updating firmware according to the invention. In accordance with FIGS. 3A, 3B and 5, the method for updating firmware is detailed as follows.

Step S501: Connect the programmable SOC apparatus 200 with the computer host 160. For example, the programmable SOC apparatus 200 employs the transmission and logic module 210 to connect with the computer host 160 via the transmission interface 140.

Step S502: The transmission and logic module 210 stores the boot loader codes provided by the computer host 160 into the DRAM 220.

Step S503: The transmission and logic module 210 checks whether a predetermined instruction sent from computer host 160 is received. If NO, the flow returns to the step S502; otherwise, the flow goes to the step S504.

Step S504: The transmission and logic module 210 enables a control signal CS.

Step S505: After receiving the enabled control signal CS, the microcontroller 110 starts to execute the boot loader codes stored in the DRAM 220; meanwhile, the microcontroller 110 is set into an ISP mode.

Step S506: The microcontroller 110 stores firmware that the programmable SOC apparatus executes in a normal mode into the flash memory 130A. In this step, depending on communications between the transmission interface 140 and the computer host 160, the microcontroller 110 programs firmware that the programmable SOC apparatus executes in a normal mode from the computer host 160 into the flash memory 130A via the address bus FA and the data bus FD. Thus, the whole updating firmware procedure is complete in this step.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A programmable system-on-chip (SOC) apparatus connected to a computer host for updating firmware that the programmable SOC apparatus executes in a normal mode, the programmable SOC apparatus comprising:
  a transmission interface for connecting with the computer host;
  a first multiplexer for receiving both address data of a first address bus and address data of a second address bus, and selecting either of the two address data for output as the address data of a third address bus;
  a volatile memory connected to the third address bus for storing boot loader codes;
  a transmission and logic module for receiving the boot loader codes from the computer host via the transmission interface and for storing the boot loader codes into the volatile memory by means of the first address bus and a data bus, wherein the first multiplexer selects the address data of the first address bus for output as the address data of the third address bus and the transmission and logic module enables a control signal while receiving a predetermined instruction from the computer host;
  a microcontroller connected to the second address bus for receiving the control signal, wherein the first multiplexer selects the address data of the second address bus for output as the address data of the third address bus if the control signal is enabled, and wherein the microcontroller connects with the computer host via the transmission interface to program firmware after reading and executing the boot loader codes; and
  a non-volatile memory connected to the microcontroller for storing firmware;
  wherein the transmission interface, the volatile memory, the transmission and logic module, the first multiplexer and the microcontroller are embedded in a chip.

2. The apparatus according to claim 1, wherein the non-volatile memory is located outside the chip.

3. The apparatus according to claim 1, wherein the non-volatile memory is embedded inside the chip.

4. The apparatus according to claim 1, wherein the non-volatile memory is a flash memory or an electrically erasable programmable read-only memory.

5. The apparatus according to claim 1, wherein the volatile memory is selected from the group comprising a static random access memory, a dynamic random access memory and a double data rate random access memory.

6. The apparatus according to claim 1, wherein the transmission interface is selected from the group comprising a parallel interface, a serial interface, a universal serial bus interface and an inter-IC serial bus interface.

7. The apparatus according to claim 1, further comprising:
  a second multiplexer embedded inside the chip for receiving both data from the non-volatile memory and data from the volatile memory and for selecting either of the two data to be sent to the microcontroller, wherein the second multiplexer selects the data from the volatile memory to be sent to the microcontroller while the control signal is enabled.

* * * * *